United States Patent

Bushnell et al.

Patent Number: 5,597,293
Date of Patent: Jan. 28, 1997

[54] COUNTERWEIGHT DRAG ELIMINATOR

[75] Inventors: Paul J. Bushnell, Syracuse; Donald Yannascoli, Manlius, both of N.Y.

[73] Assignee: Carrier Corporation, Syracuse, N.Y.

[21] Appl. No.: 570,065

[22] Filed: Dec. 11, 1995

[51] Int. Cl.$^6$ .................................................. F04B 17/03
[52] U.S. Cl. ........................................ 417/410.3; 418/151
[58] Field of Search ...................... 417/410.3; 418/151; 310/51

[56] References Cited

U.S. PATENT DOCUMENTS

| | | | |
|---|---|---|---|
| 4,934,910 | 6/1990 | Utter | 418/151 |
| 5,030,073 | 7/1991 | Serizawa et al. | 418/151 |

FOREIGN PATENT DOCUMENTS

| | | | |
|---|---|---|---|
| 0208689 | 8/1988 | Japan | 418/151 |
| 0215893 | 9/1988 | Japan | 418/151 |

Primary Examiner—Timothy Thorpe
Assistant Examiner—Peter G. Korytnyk

[57] ABSTRACT

The end ring(s) and counterweight(s) attached to the rotor of a hermetic compressor are located within a cover which isolates them from the interior of the compressor. The cover may be fixed or it may rotate as a unit with the rotor, end ring and counterweight. In each embodiment the asymmetric counterweight is prevented from acting as a fan with respect to the interior of the shell and is thereby prevented from producing a pressure gradient tending to act on the sump and cause a higher oil circulation rate to the refrigeration system.

3 Claims, 3 Drawing Sheets

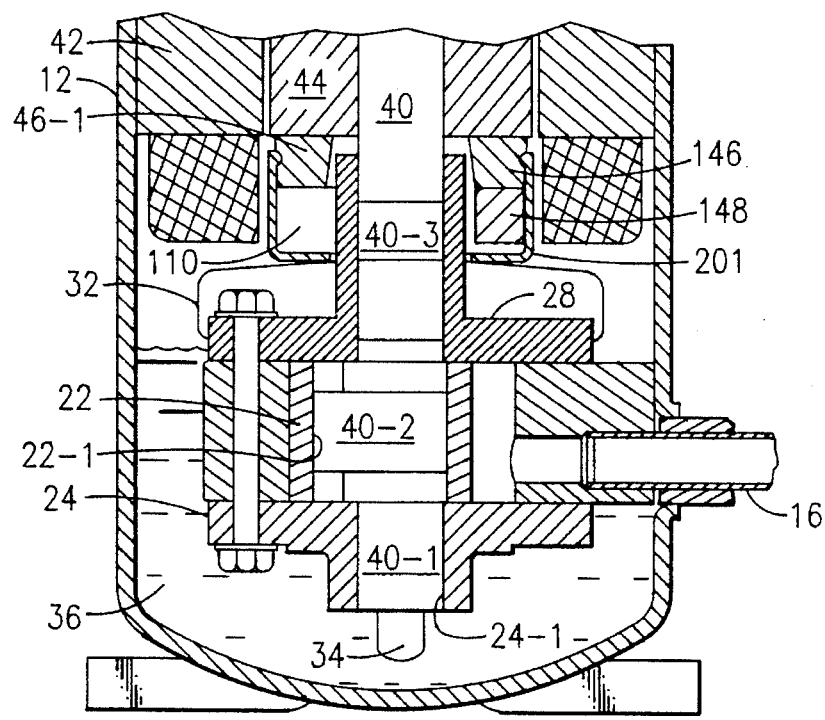
FIG.4
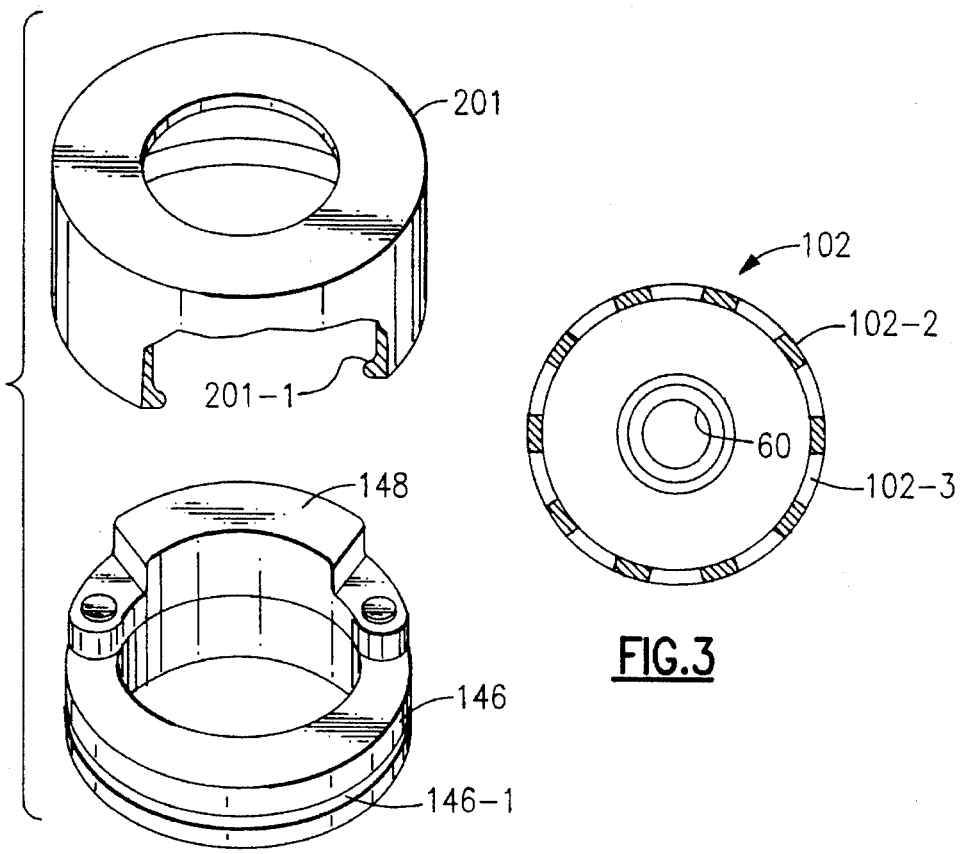
FIG.5
FIG.3

5,597,293

COUNTERWEIGHT DRAG ELIMINATOR

BACKGROUND OF THE INVENTION

In a high side hermetic compressor all or most of the interior of the shell is at discharge pressure which acts over the oil sump. For a fixed vane or rolling piston compressor the only moving parts, with minor exceptions, exposed to the interior of the compressor are the crankshaft and the parts secured thereto such as the rotor and oil pump. To balance the eccentric forces of the compression process on the shaft, the rotor is normally provided with end rings carrying counterweights. A bore in the shaft, the annular space between the stator and rotor and/or the space(s) between the shell and stator define the discharge path for compressed refrigerant and entrained oil as well as a mechanism for centrifugal separation of the entrained oil. The counterweights which provide balancing forces on the shaft are necessarily asymmetrical and act as fans, with resulting drag forces, while rotating in the discharge gas each providing pressure differences in the shell which can act on the oil sump.

SUMMARY OF THE INVENTION

The present invention places a cover over one or both of the end rings and its counterweight such each that a symmetrical profile is presented to the interior of the shell. The cover may be attached to the rotor and rotate therewith or may be secured to fixed structure such as the motor end bearing and top shell so that the counterweights rotate within the covers. Accordingly, either a symmetrical structure rotates within the shell or a non-symmetrical structure rotates within a cover which isolates it from the interior of the shell. The present invention has two major effects in that: 1) drag losses of the rotor are reduced, and 2) oil circulation is reduced. The drag loss reduction is due to the shielding effect of the cover as it rotates with the counterweight and prevents the counterweight(s) from acting as a fan. The reduction in oil circulation is a result of the elimination of the pressure profile within the shell due to the rotation of the counterweight(s). The pressure profile is such that higher pressure tends to be created at the outer portion of the interior of the shell which also tends to be in fluid communication with return path(s) to the sump. Accordingly, a higher pressure is applied to the sump resulting in lower oil level and a higher differential pressure across the centrifugal oil pump defined by the shaft. The higher differential pressure, avoided by the present invention, causes more oil to be pumped and more oil to pass into the system causing reduced capacity and EER. Additionally, there appears to be a sound reduction associated with the use of the present invention.

It is an object of this invention to reduce the oil circulation rate in a high side compressor.

It is another object of this invention to improve the capacity and EER of a refrigeration system.

It is a further object of this invention to eliminate drag losses of the rotor by allowing the viscous or shear forces to act on the rotor counterweight cover(s). These objects, and others as will become apparent hereinafter, are accomplished by the present invention.

Basically, the end rings and their counterweights of the rotor are shielded from the interior of the shell such that the asymmetrical counterweight can not act as a fan with respect to the interior of the shell and thereby pressure profiles tending to cause the pumping of excess oil are avoided. The shielding may rotate with the rotor or may be fixed.

BRIEF DESCRIPTION OF THE DRAWINGS

For a fuller understanding of the present invention, reference should now be made to the following detailed description thereof taken in conjunction with the accompanying drawings wherein:

FIG. 3 is a sectional view taken along line 3—3 of FIG. 1;

FIG. 4 is a partial, partially sectioned view of a modified embodiment; and

FIG. 5 is an exploded view of a portion of the FIG. 4 embodiment.

DESCRIPTION OF THE PREFERRED EMBODIMENTS

Figure 1:
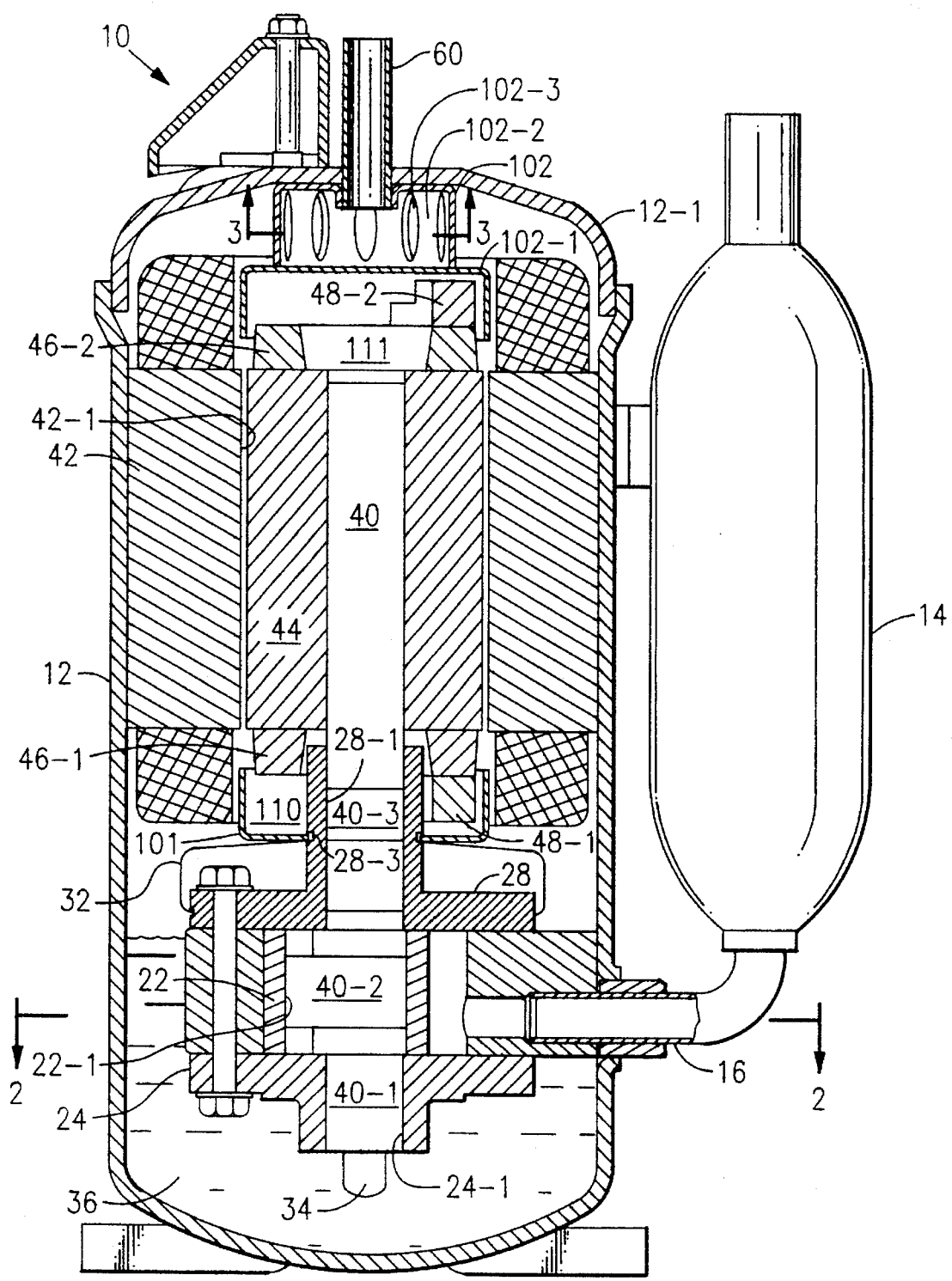
FIG. 1 is a partially sectioned view of a compressor employing the present invention.
Figure 2:
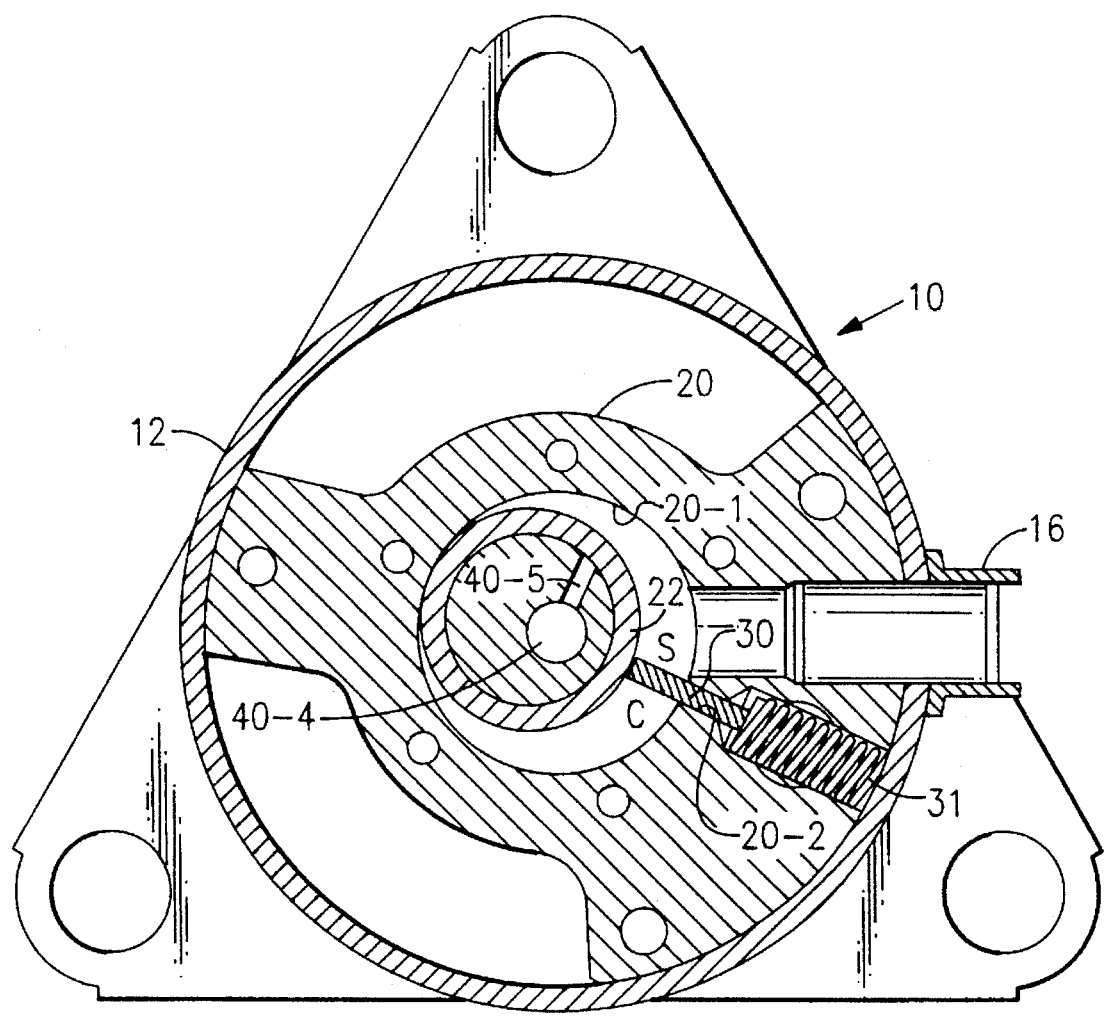
FIG. 2 is a sectional view taken along line 2—2 of FIG. 1.

In FIGS. 1 and 2, the numeral 10 generally designates a vertical, high side, rolling piston compressor. The numeral 12 generally designates the shell or casing. Suction tube 16 is sealed to shell 12 and provides fluid communication between suction accumulator 14 in a refrigeration system and suction chamber S. Suction chamber S is defined by bore 20-1 in cylinder 20, piston 22, pump end bearing 24, motor end bearing 28, and vane 30.

Eccentric shaft 40 includes a portion 40-1 supportingly received in bore 24-1 of pump end bearing 24, eccentric 40-2 which is received in bore 22-1 of piston 22, and portion 40-3 supportingly received in bore 28-1 of motor end beating 28. Oil pick up tube 34 extends into sump 36 from a bore in portion 40-1. Stator 42 is secured to shell 12 by shrink fit, welding or any other suitable means. Rotor 44 is suitably secured to shaft 40, as by a shrink fit, and is located within bore 42-1 of stator 42 and coacts therewith to define a fixed speed induction motor. End rings 46-1 and 46-2 are secured to the ends of rotor 44. Counterweights 48-1 and 48-2 are integral with or secured to end rings 46-1 and 46-2, respectively. Vane 30 is biased into contact with piston 22 by spring 31. As described so far, compressor 10 is generally conventional.

The present invention adds cover 101 to shield end ring 46-1 and counterweight 48-1 and, preferably, adds cover 102 to shield end ring 46-2 and counterweight 48-1. Cover 101 is secured to motor end bearing 28 as by a snap on process or other suitable assembly and coacts with motor end bearing 28 to define an annular recess 110 in which end ring 46-1 and counterweight 48-2 rotate while being shielded from the interior of shell 12. As illustrated, an annular groove 28-3 is provided in bearing 28 for receiving cover 101 in a snap fit. Accordingly, rotation of counterweight 48-1 does not cause it to act as a fan with respect to the interior of shell 12 and therefore does not cause any gradient due to fluid drag from counterweight 48-1 pressure. Rotation of counterweight 48-1 does provide resistance due to the resistance to the rotation of asymmetric counterweight 48-1 as well as due to the limited clearance between rotating end ring 46-1 and counterweight 48-1 with respect to cover 101.

Cover 102 is secured to top shell 12-1. Cover 102 differs from cover 101 in that it has a cup shaped first portion 102-1 defining chamber 111 and a second portion 102-2 which defines a part of the discharge flow path via ports 102-3, as shown in FIGS. 1 and 3. End ring 46-2 and counterweight 48-2 rotate in chamber 111 while being shielded from the interior of shell 12. Accordingly, rotation of counterweight 48-2 does not cause it to act as a fan with respect to the interior of shell 12, but since it is on the opposite side of the motor from the oil sump 36, the absence of cover 102 would have less significance on the oil level. Rotation of counterweight 48-2 does provide resistance due to the resistance to the rotation of asymmetric counterweight 48-2 as well as due to the limited clearance between rotating end ring 46-2 and counterweight 48-2 with respect to portion 102-1.

In operation, rotor 44 and eccentric shaft 40 rotate as a unit and eccentric 40-2 causes movement of piston 22. Oil from sump 36 is drawn through oil pick up tube 34 into bore 40-4 which may be skewed relative to the axis of rotation of shaft 40 and acts as a centrifugal pump. The pumping action will be dependent upon the rotational speed of shaft 40. As best shown in FIG. 2, oil delivered to bore 40-4 is able to flow into a series of radially extending passages, in portion 40-1, eccentric 40-2 and portion 40-3 exemplified by 40-5 in eccentric 40-2, to lubricate bearing 24, piston 22, and bearing 28, respectively. The excess oil flows from bore 40-4 and either passes downwardly over the rotor 44 and stator 42 to the sump 36 or is carried by the gas flowing from annular gap between rotor 44 and stator 42 as well as from gaps between stator 42 and shell and impinges and collects on the inside of cover 12-1 before draining to sump 36. Piston 22 coacts with vane 30 in a conventional manner such that gas is drawn through suction tube 16 to suction chamber S. The gas in suction chamber S is compressed and discharged via a discharge valve (not illustrated) into the interior of muffler 32. The compressed gas passes through muffler 32 into the interior of shell 12 and passes via the annular gap between rotating rotor 44 and stator 42 and the gaps between the stator 42 and shell 12 thence through ports 102-3 in portion 102-2 of cover 102 and through discharge line 60 to the refrigeration system (not illustrated). As noted above, covers 101 and 102 prevent the counterweights 48-1 and 48-2, respectively, from acting as fans that create a pressure profile acting on the sump 36 with a resultant increase in pumped oil and in oil circulation in the refrigeration system (not illustrated).

FIGS. 4 and 5 show a modified cover 201 and end ring 146 which has counterweight 148 suitably secured thereto. This embodiment can be used for both end rings of the motor and differs from the embodiment of FIGS. 1–3 in that cover 201 is secured to end ring 146 and rotates, as a unit, with end ring 146 and counterweight 148 which are shielded from the interior of shell 12. Cover 201 can be secured to end ring 146 in any suitable manner but is illustrated as being secured in a snap on manner via an annular bead 201-1 on cover 201 being received in a complementary circumferential recess 146-1 in end ring 146. Because cover 201 shields the rotating counterweight 148 from the interior of the shell, the counterweight 148 does not act as a fan with respect to the interior of shell 12 and does not produce the pressure gradient associated with excess oil circulation. By virtue of the fact that cover 201, counterweight 148 and end ring 146 rotate as a unit, counterweight drag is significantly reduced, if not eliminated, and only shear fluid forces act on the rotor assembly.

Although the present invention has been illustrated and described in terms of a vertical, fixed speed compressor, other modifications will occur to those skilled in the art. For example, the invention is applicable to other compressors such as horizontal compressors. Similarly the motor may be a variable speed motor. It is therefore intended that the present invention is to be limited only by the scope of the appended claims.

What is claimed is:

1. A high side rotary compressor comprising:

shell means having a first end and a second end and defining an interior;

cylinder means containing pump means including a vane and a piston coacting with said cylinder means to define suction and compression chambers;

said cylinder means being fixedly located in said shell means near said first end and defining with said first end a first chamber which has an oil sump;

first bearing means secured to said cylinder means and extending towards said oil sump;

second bearing means secured to said cylinder means and extending towards said second end;

motor means including rotor means and stator means;

said stator means fixedly located in said shell means between said cylinder means and said second end and axially spaced from said cylinder means and said second bearing means;

eccentric shaft means supported by said first and second bearing means and including eccentric means operatively connected to said piston;

said rotor means secured to said shaft means so as to be integral therewith and located within said stator means so as to define therewith an annular gap;

end ring means and counterweight means secured to said rotor means;

suction means for supplying gas to said pump means;

discharge means fluidly connected to said shell means;

cover means fixed to said second bearing means and separating said end ring means and said counterweight means from said interior whereby when said counterweight means is rotated said cover means prevents said counterweight means from acting as a fan with a resultant pressure profile acting on said oil sump.

2. A high side rotary compressor comprising:

shell means having a first end and a second end and defining an interior;

cylinder means containing pump means including a vane and a piston coacting with said cylinder means to define suction and compression chambers;

said cylinder means being fixedly located in said shell means near said first end and defining with said first end a first chamber which has an oil sump;

first bearing means secured to said cylinder means and extending towards said oil sump;

second bearing means secured to said cylinder means and extending towards said second end;

motor means including rotor means and stator means;

said stator means fixedly located in said shell means between said cylinder means and said second end and axially spaced from said cylinder means and said second bearing means;

eccentric shaft means supported by said first and second bearing means and including eccentric means operatively connected to said piston;

said rotor means having a first end and a second end and secured to said shaft means so as to be integral therewith and located within said stator means so as to define therewith an annular gap;

end ring means and counterweight means located at and secured to said first and second ends of said rotor means, respectively;

suction means for supplying gas to said pump means;

discharge means fluidly connected to said shell means;

cover means separating in a non-contact manner each of said end ring means and each of said counterweight means from said interior whereby when said counterweight means are rotated said cover means prevent said counterweight means from acting as fans with a resultant pressure profile acting on said oil sump.

3. The compressor of claim 2 wherein one of said cover means covers said end ring means and said counterweight means attached to said first end of said rotor means and is fixed to said second bearing means, and another of said cover means covers said end ring means and said counterweight means attached to said second end of said rotor means and is fixed to said second end of said shell means.

* * * * *